United States Patent [19]

Gear

[11] Patent Number: 5,579,401
[45] Date of Patent: Nov. 26, 1996

[54] FEATURE GROUPING IN MOVING BODIES IN AN IMAGE

[75] Inventor: C. William Gear, Princeton, N.J.

[73] Assignee: NEC Research Institute, Inc., Princeton, N.J.

[21] Appl. No.: 525,814

[22] Filed: Sep. 7, 1995

Related U.S. Application Data

[63] Continuation of Ser. No. 164,467, Dec. 8, 1993, abandoned.

[51] Int. Cl.$^6$ .................................................... G06K 9/00
[52] U.S. Cl. ........................... 382/100; 382/205; 382/206; 382/236; 348/416; 348/669
[58] Field of Search .................................. 382/100, 190, 382/197, 205, 276, 302, 254, 177, 286; 348/669, 416

[56] References Cited

U.S. PATENT DOCUMENTS

| | | | |
|---|---|---|---|
| 4,796,087 | 1/1989 | Guichard et al. | 358/136 |
| 5,067,014 | 11/1991 | Bergen et al. | 382/54 |
| 5,168,457 | 12/1992 | Karen et al. | 364/467 |
| 5,173,945 | 12/1992 | Pieters et al. | 382/1 |
| 5,325,449 | 6/1994 | Burt et al. | 382/41 |
| 5,351,184 | 9/1994 | Lu et al. | 364/165 |

OTHER PUBLICATIONS

Carlo Tomasi et al, "Shape and Motion from Image Streams: a Factorization Method Full Report on the Orthographic Case", Cornell TR 91–1270 and Carnegie Mellion CMU–CS–92–104, Mar. 1992 pp. 1–36.

Terrance E. Boult et al, "Factorization–based Segmentation of Motions", Proceedings of the IEEE Workshop on Visual Motoion Oct. 1991, pp. 179–186.

Carlo Tomasi et al, "Detection and Tracking of Point Features", Apr. 1991, CMU–CS–91–132 School of Computer Science, Carnegie Mellon Univeristy, Pittsburgh, PA, 15213, pp. 1–32.

Terrance E. Boult et al., "Factorization–based Segmentation of Motions" Proceedings of the IEEE Workshop on Visual Motion. Oct. 1991, pp. 179–186.

*Primary Examiner*—Jose L. Couso
*Assistant Examiner*—Anh Hong Do
*Attorney, Agent, or Firm*—Philip J. Feig

[57] ABSTRACT

Feature grouping of moving rigid bodies in an image is accomplished by processing a sequence of two-dimensional orthogonal projection of a three-dimensional scene containing a plurality of such independently-moving rigid bodies.

26 Claims, 1 Drawing Sheet

FEATURE GROUPING IN MOVING BODIES IN AN IMAGE

This is a continuation of patent application Ser. No. 08/164,467 filed Dec. 8, 1993, now abandoned.

FIELD OF THE INVENTION

The present invention relates to feature grouping of moving bodies in images and specifically to the processing of a sequence of two-dimensional orthogonal projections of a three-dimensional scene containing a plurality of independently-moving rigid bodies.

BACKGROUND OF THE INVENTION

In the method of analyzing a sequence of two-dimensional images containing a plurality of independently moving rigid bodies to ascertain three-dimensional information about the moving bodies, various prior art techniques are available for readily identifying features or points associated with the rigid bodies common to the image frames. Similarly, once all the features or points of a selected rigid body have been identified in successive image frames, prior art techniques are available for providing the desired three-dimensional information about the selected rigid body.

However, there remains a need for a better process for determining which features or points in the successive image frames are associated with which rigid body in the images. The present invention is directed to this need.

Prior art processing assumed to have identified features or points common to all image frames. The present invention permits determination of which features or points are associated with which rigid body in an image containing a plurality of such rigid bodies.

A camera records an image comprising a plurality of independently moving rigid bodies. The motions are relative to the camera and hence, the camera determines a fixed coordinate system. If the scene includes a "background" and the camera is moving, the background will appear as another object moving relative to the camera.

In accordance with the teachings of the present invention, two-dimensional projections are generated by a set of rigid bodies moving freely in three-dimensional space. The projections are specified by the mathematical product of matrices with very special structural properties determined by the quantity of bodies and the degree of independence of their respective motions. The present invention concerns the regenerating of those structures from the set of two-dimensional observations.

More particularly, in the field of image processing it is well known to apply feature detection algorithms and techniques to each image frame in order to identify and locate points or features common to the image in each frame. For example, each corner of an object in an image frame can be identified and its coordinate in the image frame determined.

Moreover, it is known in the art how to determine position and velocity of objects from a sequence of image frames, such as are obtained from a camera, video recorder or the like.

The present invention provides a vital link between the "front end" feature detector and the "back end" processor of object position and velocity. That is, a computer used to practice the present invention receives as its input, data of the feature points and their coordinates in each image frame, usually in the form of electrical signals from standard feature detectors, such as the one described by Tomasi and Kanade in a report entitled "Detection and Tracking of Point Veatures", Tech Report CMU-CS-91-132, Carnegie Mellon University, School of Computer Science, Pittsburgh, Pa., and provides at its output data indicative of which of the detected feature points are associated with a respective moving body in a sequence of images containing a plurality of such moving bodies for further application dependent processing of the trajectories of each moving body.

The invention has application in such fields as collision avoidance. For example, a camera located in the front of a vehicle, which may be either stationary or moving, records images of the scene. In the case of an automobile traveling on a roadway, the images might include a background, road signs, other vehicles travelling on the road and so forth. The sequence of images frames are pre-processed by a standard feature detector. The resultant data is provided, in accordance with the present invention, to a general purpose computer where the detected points are grouped as to specific features or bodies in each image frame. The data as to which points are associated with which moving body in the image are provided, for example, to a conventional collision accordance system in order to determine which, if any, moving body will collide with the vehicle, which moving bodies are moving away from the vehicle or which moving bodies are moving in unison with the moving vehicle. Also determinable are which objects form a part of the background or off-the-road objects which are not a threat to the vehicle. In the absence of feature grouping, the mere detection of feature points will not result in proper collision accordance.

In a similar manner, the invention has applicability to robot vision systems, for example, for distinguishing among multiple moving objects traveling past the robot. The invention is also useful in robot vision systems for collision avoidance of a moving robot. Another application is for grouping or distinguishing image points of a robot hand as contrasted with the image points of an object being manipulated by the hand.

The above examples are merely illustrative of the applications to which the invention may be applied. It will be apparent to those skilled in the art that the present invention has utility and application in many other image processing applications.

In each of these illustrative examples, the present invention provides a means for receiving data from a conventional feature detector indicative of detected feature points and processing the data in order to group detected points as arising from a respective moving body in an image containing a plurality of such moving bodies, so that additional signal processing may be performed on the processed data based upon the points associated with each moving body in the image frames.

SUMMARY OF THE INVENTION

The present invention relies upon matrix analysis to associate points with a respective rigid body in an image containing a plurality of such rigid bodies, each of which may be undergoing independent motion. The columns of the matrices are related to the point or feature detected and tracked and the rows refer to the x and y (two-dimensional) location of the points in successive image frames. The dependency of the points is determined by the dependency of the motion.

Data related to each detected point is obtained for each frame by a feature detector. The data is entered into a matrix which is then subject to a large batch process at the end of the data gathering.

The rank of the matrix is determined. The matrix rank is related to the quantity of moving bodies in the image.

The Gauss-Jordan algorithm is applied to the matrices in order to determine the number of independent degrees of freedom, that is, the non-zero elements in the matrices. The result is S independent columns and P-S dependent columns, where P is the total number of points. If the columns are dependent, the associated points arise from the same body.

Consider the example of a single rigid, moving body. If the two-dimensional view is in the x-y plane of the fixed camera and the set of points (features) on the moving body are specified by the matrix W where $$W=[w_1 w_2 \ldots w_n]$$

and the $w_i$ are column vectors consisting of $$w_i = \begin{bmatrix} x_i \\ y_i \\ z_i \\ 1 \end{bmatrix}$$

where the $x_i$, $y_i$, and $z_i$ are the coordinates of the i-th point in a body-centered frame of reference. It is well known that a general three-dimensional rotation and translation of the point w can be specified as $\hat{T}w$ where the 3 by 4 transformation $\hat{T}$ is given by $$\hat{T} = \begin{bmatrix} & & & t_x \\ & U & & t_y \\ & & & t_z \end{bmatrix},$$

where U is a 3 by 3 unitary matrix with determinant one that represents a rotation about the body-coordinate origin, and the $t_x$, $t_y$ and $t_z$ are the components of the translation. The two-dimensional projection of the rotated point is obtained by omitting the third row of $\hat{T}$ so that T becomes $$T = \begin{bmatrix} u_1 & t_x \\ u_2 & t_y \end{bmatrix}$$

with the three-element row vectors $u_i$ being mutually orthogonal and of Euclidean length one. The horizontal (h) and vertical (v) coordinates of the point in the image are then given by $$\begin{bmatrix} h \\ v \end{bmatrix} = Tw$$

Suppose now that each frame is the result of a different transformation, $T_j$, j=1, ..., m. Let the matrix Q be given by $$Q = \begin{bmatrix} T_1 \\ T_2 \\ \cdot \\ \cdot \\ T_m \end{bmatrix}.$$

The set of observations D in all frames for all points X is given by $$D = QW$$

where D is a 2 m by n matrix whose pairs of rows are the h-v coordinates of the projections of all n points $w_i$.

As long as the points do not lie in a plane or lower-dimensional space, the rank of W is four, so it has full rank. As long as there are a sufficient number of different transformations (a minimum of 2) and they are sufficiently independent so that Q also has full rank (four) then the rank of D will be four. In the presence of errors, D is likely to have full rank, namely min(2 m, n).

The singular value decomposition (SVD) transformation could be used to compute the closest rank-four, matrix to the observed D by first computing the SVD of D as $$D = U\Sigma V^T$$

and then the approximation as $$\tilde{D} = \tilde{U}\tilde{\Sigma}\tilde{V}^T$$

where $\tilde{U}$ and $\tilde{V}^T$ are the first four columns of U and V respectively, and $\tilde{\Sigma}$ is the upper 4 by 4 block of $\Sigma$ (and so contains the largest four singular values on the diagonal).

Tomasi and Kanade in a report entitled "Shape and Motion from Image Streams: Full Report on the Orthographic Case", Tech Reports CMU-CS-92-104, Carnegie Mellon University Computer Science Department, Pittsburgh, Pa. and TR 92-1270, Cornell University Computer Science Department, Ithaca, N.Y., first removed the translation by computing the origin of each frame as the centroid of the set of points of each view. This origin is the projection of the centroid of the sets of points in the original three-dimensional body, so it effectively modifies the motion by fixing the centroid to lie at the origin of the three-dimensional space. Thus, any translation has been removed and the resulting motion is solely a rotation about the origin. This results in a rank three system with the last column of Q and the last row of W dropped. Tomasi and Kanade then recover the 3-dimensional coordinates for frames of a single moving body by applying the SVD to compute the closest rank 3 approximation to D. Their method is applicable to a single body only.

Boult and Brown in an article entitled "Factorization-based Segmentation of Motion" in the Proceedings of the IEEE Workshop on Visual Motion, dated October 1991 at pages 179 to 186, proposed an extension of the Tomasi and Kanade approach to multiple bodies. They perform a cluster analysis of components in the right singular vectors (the columns of V from the SVD decomposition) and claim that these clusters indicate the clustering of points to objects. They also shift the origin to the centroid of all observed features and claim that the resulting data has rank 3 s where s is the number of rigid bodies. In fact, the rank can be as large as 4 s without the shift, and 4 s−1 with the shift, as will be shown below. The present method uses rank information.

The present invention concerns the full four-dimensional system and uses a novel matrix decomposition to recover the underlying matrix structure, an approach that is applicable to multiple bodies.

A principal object of the present invention is therefore, the provision of feature grouping of independently moving rigid bodies in an image containing a plurality of moving bodies.

Another object of the invention is the provision of determining which points or features in an image are associated with a respective moving rigid body.

A further object of the invention is the provision of determining the number of independent moving bodies present in an image.

Further and still other objects of the present invention will become more clearly apparent when reading the following description is read in conjunction with the accompanying drawing.

DETAILED DESCRIPTION OF THE INVENTION

Figure 1:
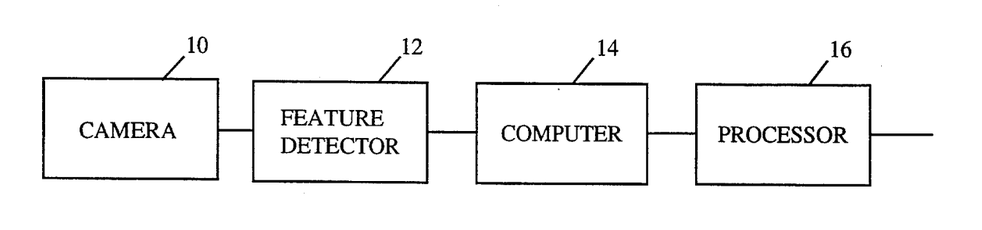
The sole FIGURE is a schematic representation of the present invention.

Referring now to the FIGURE, a camera 10 records a sequence of images of a scene containing a plurality of moving bodies. The sequence of images is provided from the camera to a feature detector 12 where points arising from the moving bodies are identified along with each point's respective co-ordinate in the image. A preferred feature detector is described in report CMU-CS-91-132 by Tomasi and Kanade, supra. The co-ordinates of the identified points are provided as an output from feature detector 12 to a computer 14 for processing in accordance with the teachings of the present invention which shall be described below. At the output of computer 14 is information conamensurate with the quantity of moving bodies present in the scene and which of the identified points are associated with each respective body. The output of computer 14 is provided to an application specific processor 16 for determining the trajectories of each body in the scene.

The following description sets forth the process performed by computer 14 for providing the information commensurate with the quantity of bodies present in the sequence of images and which identified points in the images are associated with each respective body.

Suppose that there are s bodies, and that each body has a set of $n_p$ feature points with coordinates collected in the matrices $W_p$, p=1, . . . , s. The feature points and their respective coordinates are obtained in a conventional manner using standard feature detection. The complete set of points is then represented by $$M = \text{diag}(W_1, W_2, \ldots, W_s).$$

Although this might be called a block diagonal matrix, note that each block is rectangular 4 by $n_p$, so M is not a square matrix.

Suppose that the p-th object in the j-th frame is subject to the transformation/projection represented by $T_{jp}$. Let T be the block matrix with entries $T_{jp}$, j=1, . . . , m;p=1, . . . , s. Then the observed data can be represented as the 2 m by $N = \Sigma_1^s n_p$ matrix $$D = TM.$$

This matrix will have rank no greater than 4 s, and 4 s will be achieved if at least four non-coplanar feature points are chosen in each body and if there are sufficiently many independent motions to span the space of independent motions for all bodies.

If the rank of D is known, and from the preceeding paragraph the rank is no greater than 4 s, it follows that knowing the rank leads to a lower bound on the number of independent bodies. The rank of D could be estimated using the SVD, but it is a moderately expensive computation for a large number of points. Furthermore, the SVD estimation provides no direct information about the grouping of points to independent moving objects. Each column of D represent a single feature point. The set of feature points associated with a single object lies in a four- (or less) dimensional subspace of the 2 m-dimensional space of column vectors. Thus, if these subspaces can be identified and the column vectors that lie in them, the grouping of feature points to bodies will be identified. The reduced row echelon (hereinafter referred to as the echelon form) form of D does just that, while identifying the rank of the matrix.

The echelon form is found by applying Gauss-Jordan elimination to the rows of D with partial pivoting. An outline of the algorithm is (for a matrix with R rows and C columns):

```
Col := 1
Row := 1
while (Row ≤ R and Col ≤ C) do
    Switch rows so that largest of |D_{i,Col}|, i = Row, ..., R
        is in D_{Row,Col}.
    if D_{Row,Col} ≠ 0 then
        Divide row Row by D_{Row,Col}
            (D_{Row,Col} is the Pivot)
        for Other.row := all other rows except Row
            Subtract D_{Other.row,Col} times row Row
                from row Other.row.
        endfor
        Row := Row + 1.
    endif
    Col := Col + 1
endwhile
Rank of matrix is Row − 1
```

In the presence of noise and numerical error, this algorithm will normally indicate a full rank matrix. To avoid this problem, the test for a zero pivot in the if statement must be replaced with a test of the form if $D_{Row,Col}$>tolerance then where tolerance is selected to treat small numbers arising from noise as zero. In the general application of the echelon form, determining the correct tolerance is a very difficult problem, which is one reason why the more stable SVD is preferable for rank determination, but in this application, the nature of the problem and knowledge of the structure provide a priori information about the size of tolerance. Furthermore, it is not necessary to obtain a precise value for the rank: what is important is that a high percentage of the points be assigned to the objects to which they belong. If it is not possible to allocate all points, the unallocated points can be ignored. Note that if T has full rank and no numerical errors occur in the reductions, the echelon form of M is the same as the echelon form of D.

During the reduction to echelon form, each column in turn will be reduced either to a column containing all zeros except for a single one in the Pivot element (this occurs in columns for which the if test is successful, which will be called base columns), or to a column containing non-zeros only in rows in which exactly one other base column has a one.

The base columns form a basis for the space spanned by the columns of the echelon form of M. Due to the structure of M, a maximum of four base columns will be associated with each rigid body.

Columns correspond to points. In the absence of error, any two columns which have non-zero elements in the same row of the echelon form correspond to points belonging to the same rigid body if the transformation matrix has full rank.

The observation matrix D is generated from the body matrix M by left multiplication by the transformation matrix T. This performs row operations on W only. If T has full rank, no information has been lost concerning the row rank of M. Reduction to echelon form also uses row operations, so will result in the same matrix as a direct reduction of M to echelon form apart from row interchanges. The echelon form of M=diag($W_p$) is a block diagonal matrix whose blocks are the echelon forms of each $W_p$, and these have the stated property.

The approach suggested above uses partial pivoting which is sensitive to isolated large translations (which could make a particular row of the matrix large and force it to be chosen as the first pivot, whereas the algorithm should preferably choose base columns which are good choices as a basis for each rigid body (that is, they are not nearly dependent). For this reason, it is worthwhile to use full pivoting, which looks at all unpivoted columns to determine the best candidate for the next pivot on the basis of the largest element. It is also preferable to perform some preliminary scaling and shift operations on D so that the largest element does represent the best pivot. The choice of column scaling is discussed below. Row scaling is done to remove arbitrary scalings from rows so that they are all of the same order of size. Neither scaling affects the rank of the matrix. In fact, if orthogonal projections are done, and no change of scale is made, no row scaling should be necessary and all rows should remain around the same size. However, if the orthogonal assumption is an approximation to the perspective projection usually obtained, scaling will occur as the object varies in distance from the camera. A large translation of the view can also result in an apparent change of scale for the corresponding rows. Translating each row so that it is "centered" around the origin and scaling each row so that some simple norm is the same will remove most of these variations.

In the example below the following operations were performed: Each row was first shifted and scaled to lie in the range (−1, +1). The shift corresponds to changing the translations of each frame. It could reduce the rank by one if the shifts were unfortunate, or, if the original data did not include independent translations for each body, it could increase the rank by one. It will not be important in either case. Then, full pivoting was used to select the next pivot. Rows were interchanged as in the algorithm above, columns were not interchanged in order to retain the correspondence with the original points.

The following example is "artificial." It was formed by generating two rigid bodies each of seven points chosen at random in a unit cube. Each body was then subjected to random rotations and translations to generate ten frames of fourteen points each to get the 20 by 21 matrix in Table 1.

TABLE 1

Columns 1 through 7

| | | | | | | |
|---|---|---|---|---|---|---|
| 0.6834 | −0.0912 | −0.2624 | 1.0000 | −0.2280 | 0.3633 | −0.3782 |
| 0.8254 | 0.7836 | 0.6636 | 0.6634 | 0.3085 | 1.0000 | 0.7290 |
| 0.4763 | −0.4381 | −0.5144 | 0.9170 | −1.0000 | 0.3930 | −0.8128 |
| −0.5607 | 0.4492 | 1.0000 | −0.8625 | −0.8476 | 0.8615 | 0.6922 |
| 0.8536 | 0.0172 | −0.3461 | 1.0000 | −0.2500 | 0.4683 | −0.3010 |
| 0.7921 | 0.9504 | 0.8190 | 0.5425 | 0.8513 | 0.8291 | 1.0000 |
| 0.8523 | 0.3522 | 0.2520 | 1.0000 | −0.1927 | 0.9028 | 0.1274 |
| 0.1259 | 0.6988 | 0.6519 | −0.3347 | 0.4380 | 0.4592 | 0.8817 |
| 0.8368 | 0.2931 | 0.1508 | 1.0000 | −0.0549 | 0.7376 | 0.0702 |
| 0.3269 | 0.8554 | 0.9980 | 0.0504 | 0.3599 | 0.8844 | 1.0000 |
| 0.1799 | −0.6265 | −0.6779 | 0.6025 | −1.0000 | 0.0488 | −0.9466 |
| 0.8176 | 0.7522 | 0.4355 | 0.5805 | 1.0000 | 0.4693 | 0.7538 |
| 0.6925 | 0.4461 | 0.2746 | 0.5753 | −0.2872 | 0.9009 | 0.2966 |
| 0.9524 | 0.9887 | 0.9960 | 0.9333 | 0.9706 | 0.9805 | 1.0000 |
| 0.3097 | −0.4216 | −0.4226 | 0.7032 | −1.0000 | 0.3495 | −0.7331 |
| 0.2714 | 0.8274 | 0.8774 | −0.0866 | 0.5301 | 0.6756 | 1.0000 |
| 0.9204 | 0.5585 | 0.4695 | 1.0000 | 0.0900 | 0.9880 | 0.3896 |
| 0.2272 | 0.7804 | 0.9088 | −0.0524 | 0.4704 | 0.6836 | 0.9500 |
| 0.5620 | −0.2203 | −0.1943 | 1.0000 | −0.9066 | 0.6578 | −0.5596 |
| −0.4531 | 0.6545 | 0.9831 | −0.9305 | 0.1108 | 0.4607 | 1.0000 |

Columns 8 through 14

| | | | | | | |
|---|---|---|---|---|---|---|
| −0.4430 | −0.8022 | −1.0000 | −0.1850 | −0.7217 | −0.8144 | −0.6569 |
| −0.4123 | −0.4975 | −0.8279 | −1.0000 | −0.5129 | −0.9993 | −0.5099 |
| 0.4320 | −0.1660 | −0.5624 | 1.0000 | 0.4453 | −0.4858 | 0.3061 |
| 0.1817 | 0.0576 | −0.5568 | −0.8309 | 0.2657 | −1.0000 | 0.1401 |
| −0.0713 | −0.5470 | −0.8523 | 0.7515 | 0.5190 | −1.0000 | 0.1177 |
| −0.0934 | −0.2861 | −0.8039 | −1.0000 | −0.4639 | −0.9532 | −0.3612 |
| −0.5099 | −0.8029 | −0.9359 | −0.3948 | −1.0000 | −0.6634 | −0.8121 |
| 0.3009 | 0.1007 | −0.4385 | 0.0081 | 1.0000 | −1.0000 | 0.5614 |
| −0.4460 | −0.7908 | −1.0000 | −0.0039 | −0.3189 | −0.9849 | −0.4572 |
| −0.3515 | −0.4676 | −0.8130 | −1.0000 | −0.6218 | −0.9123 | −0.5397 |
| 0.5020 | −0.0066 | −0.3156 | 1.0000 | 0.4346 | −0.1984 | 0.3587 |
| −0.4438 | −0.5017 | −0.6576 | −0.2381 | 0.2405 | −1.0000 | −0.1288 |
| 0.2371 | −0.3974 | −0.8695 | 1.0000 | 0.7070 | −1.0000 | 0.3246 |
| −0.4473 | −0.5047 | −0.7811 | −0.8655 | −0.3541 | −1.0000 | −0.4387 |
| 0.1859 | −0.3341 | −0.6371 | 1.0000 | 0.5762 | −0.6785 | 0.2690 |
| −0.4596 | −0.5449 | −0.7439 | −0.4486 | −0.0499 | −1.0000 | −0.2898 |
| −0.5686 | −0.8003 | −0.8910 | −0.4720 | −1.0000 | −0.6476 | −0.8278 |
| 0.0734 | −0.2063 | −0.5580 | 0.5246 | 1.0000 | −1.0000 | 0.4546 |
| −0.1983 | −0.7009 | −1.0000 | −0.0208 | −0.8108 | −0.6751 | −0.6106 |
| −0.1247 | −0.1196 | −0.5086 | −0.7175 | 0.3427 | −1.0000 | 0.0677 |

In this example, the first seven points corresponded to the first body and the second seven points to the second body. As can be seen from the echelon form in Table 2, the base columns are 3–6, 8, and 11–13. Note that there are multiple non-zeros in rows 1, 4, 6, and 8 in columns 1 through 7, and in rows 2,3,5, and 7 in columns 8 through 14, indicating that columns 1 through 7 correspond to one rigid body and 8 through 14 to the second rigid body.

In practice, there are measurement and numerical errors to be taken into account. In the next example, the observation matrix D in Table 1 was corrupted by adding Gaussian random variables, mean zero and standard deviation 0.005 to each entry. The echelon form was computed as described above but set to ignore elements of magnitude less than tolerance=0.1 as pivots. The result, in Table 3, again indicates rank 8. If elements less than 0.1 are assumed to be zero, the correct deduction can be made regarding the assignment of points to bodies.

TABLE 2

Columns 1 through 7

| | | | | | | |
|---|---|---|---|---|---|---|
| 0.2020 | −0.3697 | 0 | 1.0000 | 0 | 0 | −0.5464 |
| 0.0000 | 0.0000 | 0 | 0 | 0 | 0 | 0.0000 |
| 0.0000 | 0.0000 | 0 | 0 | 0 | 0 | 0.0000 |
| 0.5607 | 0.5969 | 0 | 0 | 1.0000 | 0 | 0.6513 |
| 0.0000 | 0.0000 | 0 | 0 | 0 | 0 | 0.0000 |
| 1.0732 | 0.9868 | 0 | 0 | 0 | 1.0000 | 0.8817 |
| 0.0000 | 0.0000 | 0 | 0 | 0 | 0 | 0.0000 |
| −0.8359 | −0.2139 | 1.0000 | 0 | 0 | 0 | 0.0134 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |
| 0.0000 | 0.0000 | 0 | 0 | 0 | 0 | 0.0000 |

Columns 8 through 14

| | | | | | | |
|---|---|---|---|---|---|---|
| 0 | 0.0000 | 0.0000 | 0 | 0 | 0 | 0.0000 |
| 0 | 0.4368 | 0.9109 | 0 | 0 | 1.0000 | 0.1162 |
| 0 | −0.3559 | −0.2909 | 1.0000 | 0 | 0 | −0.0474 |
| 0 | 0.0000 | 0.0000 | 0 | 0 | 0 | 0.0000 |
| 1.0000 | 0.5418 | −0.1355 | 0 | 0 | 0 | 0.3621 |
| 0 | 0.0000 | 0.0000 | 0 | 0 | 0 | 0.0000 |
| 0 | 0.3774 | 0.5155 | 0 | 1.0000 | 0 | 0.5690 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |
| 0 | 0.0000 | 0.0000 | 0 | 0 | 0 | 0.0000 |

TABLE 3

Columns 1 through 7

| | | | | | | |
|---|---|---|---|---|---|---|
| 0 | 1.0000 | 0.0205 | −0.1745 | 0 | 0 | 0.4197 |
| 0 | 0 | −0.0002 | 0.0005 | 0 | 0 | −0.0009 |
| 0 | 0 | 0.0000 | 0.0002 | 0 | 0 | 0.0003 |
| 0 | 0 | 0.0237 | 0.5423 | 1.0000 | 0 | 0.4557 |
| 0 | 0 | 0.4010 | 0.7859 | 0 | 1.0000 | 0.7560 |
| 0 | 0 | 0.0002 | −0.0001 | 0 | 0 | −0.0009 |
| 1.0000 | 0 | 0.5552 | −0.1535 | 0 | 0 | −0.6322 |
| 0 | 0 | 0.0004 | −0.0005 | 0 | 0 | 0.0009 |
| 0 | 0 | −0.0002 | −0.0005 | 0 | 0 | 0.0002 |
| 0 | 0 | −0.0003 | −0.0001 | 0 | 0 | 0.0001 |
| 0 | 0 | 0.0001 | −0.0002 | 0 | 0 | 0.0001 |

TABLE 3-continued

|   |   |   |   |   |   |   |
|---|---|---|---|---|---|---|
| 0 | 0 | −0.0004 | 0.0005 | 0 | 0 | −0.0002 |
| 0 | 0 | 0.0003 | 0.0000 | 0 | 0 | 0.0001 |
| 0 | 0 | 0.0000 | 0.0001 | 0 | 0 | 0.0001 |
| 0 | 0 | −0.0001 | 0.0002 | 0 | 0 | 0.0006 |
| 0 | 0 | 0.0000 | −0.0005 | 0 | 0 | −0.0001 |
| 0 | 0 | −0.0003 | 0.0000 | 0 | 0 | 0.0010 |
| 0 | 0 | −0.0005 | 0.0000 | 0 | 0 | 0.0007 |
| 0 | 0 | −0.0002 | 0.0002 | 0 | 0 | 0.0003 |
| 0 | 0 | −0.0004 | −0.0003 | 0 | 0 | 0.0006 |

Columns 8 through 14

|   |   |   |   |   |   |   |
|---|---|---|---|---|---|---|
| 0 | 0 | −0.0005 | 0 | 0.0000 | −0.0003 | 0 |
| 0 | 0 | 0.5500 | 1.0000 | 1.2244 | 1.3765 | 0 |
| 0 | 0 | −0.2937 | 0 | 0.0331 | −0.0107 | 1.0000 |
| 0 | 0 | 0.0001 | 0 | 0.0003 | −0.0003 | 0 |
| 0 | 0 | 0.0001 | 0 | 0.0003 | 0.0000 | 0 |
| 0 | 1.0000 | 1.0012 | 0 | 0.2166 | 0.5624 | 0 |
| 0 | 0 | 0.0004 | 0 | −0.0007 | 0.0002 | 0 |
| 1.0000 | 0 | −0.2574 | 0 | −0.4740 | −0.9285 | 0 |
| 0 | 0 | −0.0002 | 0 | −0.0005 | 0.0002 | 0 |
| 0 | 0 | 0.0000 | 0 | −0.0001 | −0.0002 | 0 |
| 0 | 0 | 0.0001 | 0 | −0.0001 | 0.0005 | 0 |
| 0 | 0 | −0.0004 | 0 | 0.0002 | −0.0008 | 0 |
| 0 | 0 | 0.0001 | 0 | −0.0004 | 0.0003 | 0 |
| 0 | 0 | 0.0002 | 0 | 0.0004 | −0.0002 | 0 |
| 0 | 0 | 0.0003 | 0 | 0.0001 | 0.0005 | 0 |
| 0 | 0 | −0.0006 | 0 | −0.0003 | 0.0000 | 0 |
| 0 | 0 | −0.0001 | 0 | −0.0001 | 0.0000 | 0 |
| 0 | 0 | 0.0004 | 0 | 0.0000 | 0.0004 | 0 |
| 0 | 0 | 0.0001 | 0 | 0.0002 | 0.0003 | 0 |
| 0 | 0 | −0.0003 | 0 | −0.0001 | 0.0006 | 0 |

The algorithm uses two tolerances which do not have to be identical. The first tolerance is used in the reduction to echelon form and determines when a pivot will be selected. A second tolerance can be used in determining which elements are nonzero in the application of the Observation used for the grouping. All elements in rows in which no pivots are chosen must be assumed to be zero (otherwise another pivot must be chosen) but, since the other non zeros (in the non-base columns) indicate grouping of points, the algorithm is capable of using a different tolerance to determine the grouping, larger to be more conservative and avoid false groupings, or smaller if insufficient connectivity information is obtained. We will call the first tolerance the "rank tolerance" and the second the "grouping tolerance."

Since the data is obtained from a feature detection algorithm, the algorithm is expected to generate some measure of uncertainty. If the measures of uncertainty are the same for all points, then a tolerance based on the size of the uncertainty times a factor for the size of the problem can be used directly. The factor for the size of the problem accounts for growth in the errors as they are combined during the reduction to echelon form. If the measures of uncertainty differ from point to point, the data should be initially scaled by columns to remove the differences. Since each column represents a single point sequence in the images, scaling the column by any factor is equivalent to adjusting the effect of the tolerance on that column. Thus, if the uncertainty estimate for a point $w_i$ is $\delta_i$ in arbitrary absolute units, the i-th column should be divided by $\delta_i$.

The data can indicate a natural choice of scaling and an order of magnitude for the tolerances. The question of the multiplying factors for the rank and grouping tolerances remains. If the rank tolerance is too large, too few base columns will be chosen, falsely indicating fewer independent objects. If the rank tolerance is too small, too many base columns will be chosen, indicating too many objects. In the extreme case of a very small rank tolerance, all columns will be chosen as base columns (assuming that measurement errors make the columns independent), allowing no grouping at all. Although worst case error analysis indicates that the error in the reduction to echelon form can grow as $2^N$ where $N=\Sigma_1^s n_p$ is the number of points in each frame, conventional wisdom and experience for full pivoting indicates that a growth closer to N is expected, so a reasonable rank tolerance is N*tolerance, where tolerance is the estimate of the largest error in any component.

It is also possible to use an adaptive approach to determining the rank tolerance. It can be started at a larger level than suggested, and the reduction to echelon form started, where anything below the current rank tolerance is assumed to be zero in pivot determination (but not set to zero in the calculations). If after the reduction has been completed, there are columns which have no entries greater or equal to the rank tolerance, it can be taken as an indication that the rank tolerance is too large, that tolerance can be reduced and the reduction to echelon form repeated. Of course, if the original data has a column corresponding to a point that is fixed at the origin in all frames, that column will always have all entries less than the rank tolerance and will cause the adaptive algorithm to repetitively reduce the rank tolerance. For this reason it is necessary to first preprocess the data and remove any points (columns) all of whose entries are smaller that the estimate of the data uncertainty (or to translate them to larger values). When the rank tolerance is reduced in the adaptive algorithm, it is not necessary to restart the reduction to echelon form. All that is necessary is to rescan those columns not previously chosen as pivot columns to see if any now contain possible pivots. The process can be repeated until the a reduction cycle comes to an end with no non-base columns having elements all smaller than the current rank tolerance.

If the grouping tolerance is chosen too small, a non-base column will be dependent on too many base columns, resulting in base columns incorrectly being determined to be part of the same rigid body. If the grouping tolerance is too large, it may fail to identify base columns that do belong to the same body. In the extreme case of a large grouping tolerance, a non-base column may be found to be dependent on no other columns. Since a non-base column can be dependent on no base columns only if it is entirely zero within the tolerance, and such columns were removed in the preprocessing discussed in the paragraph above, the identification of such columns indicates that the group tolerance is too large. Thus, this suggests an adaptive approach for the grouping tolerance: start the grouping tolerance at the estimate of the data errors, and perform the grouping process. If too many base columns are determined to be part of a single group (more than four), increase the grouping tolerance. (Note that this approach has to be modified in the case of transformation degeneracies discussed below.)

After the reduction to echelon form, it is interesting to sum columns of the resulting matrix. The result can be illuminating because if there are no errors in the data and the reduction to echelon form is done without error, then the column sums of all columns corresponding to points belonging to bodies that are translated (in addition to possible rotations) are one, whereas the column sums of points corresponding to bodies that are not translated are one only on a set of measure zero (in any reasonable space of random rotation).

This result may be used to group columns in the following algorithm:

Choose any column of D, say the first, and subtract it from all columns of D, thus removing any translations from all points belonging to the object corresponding to the selected column and any objects translated identically. Perform the reduction to echelon form and identify those columns whose sums are significantly different from unity. Since this process will not identify the base columns corresponding to the those objects not translated, the non-zeros in the identified columns will have to be used to identify the base columns. The columns can now be removed for further analysis (they may correspond to multiple bodies with a common translation). The remainder of the data can now be analyzed by the same process: another column is chosen and subtracted from the rest of the data to identify the next object (or group of objects) with the same translations.

Two forms of degeneracy are possible, "object degeneracy" in which the points on a single object lie in a less-than-three dimensional subspace, and "transformation degeneracy" in which the transformation matrix is not of full rank. The effects of both degeneracies will be examined and it will be shown that the former does not affect the algorithm, and, although the latter can affect it, there are techniques to overcome the difficulties.

In the case of object degeneracy, one or more of the objects, represented by the matrix $W_i$ has rank less than four, say $r_i$. This means that it can be represented by $$W_i = B_i S_i$$

where $B_i$ is a 4 by $r_i$ matrix of vectors which form a basis for the object in that all of the vectors in $W_i$ can be expressed as linear combinations of the columns of $B_i$, and each column of $S_i$ expresses the corresponding column of $W_i$ as a linear combinations of the $r_i$ columns of $B_i$. Note that $S_i$ is of full rank, $r_i$.

When the echelon form of D is formed, the echelon form of the matrix $S_i$ will be formed. The echelon form of $S_i$ will consist of $r_i$ base row vectors with a single non-zero entry equal to one, and the remainder of the columns will contain multiple non-zeros in rows corresponding to the pivots in the base columns for that object. Hence, the general observation that columns correspond to points and that any two columns which have non-zero elements in the same row of the echelon form correspond to points belonging to the same rigid body if the transformation matrix has full rank.

When the transformation matrix does not have full rank, there are two possibilities:

Case I: The transformations of a single object are of rank less than four.

Case II: The transformations of one object are linearly dependent on the transformations of another object.

Case I causes no difficulties since the symptom is indistinguishable from that of object degeneracy. Case II can complicate the procedure.

If the transformation matrix T has a rank deficiency of t, there exists a 4 s by t matrix, B, of null vectors of T such that $$TB=0.$$

In case I, each of these null vectors (the columns of B) contain non-zeros only in rows corresponding to a single object transformation, that is, to the first four columns of T for the first object transformation, the second four columns of T for the second object transformation, and so on. In case II, the null vectors will contain nonzeros in columns corresponding to all object transformations that are linearly dependent.

Without loss of generality, assume that a column of B has the form $[b^T 1]^T$. (The assumption, that the last element of the column of B is nonzero, can be achieved by interchange of columns of the observation data D.) Let the N by N matrix P be defined as $$P = \begin{bmatrix} I_{N-1} & b \\ 0 & 1 \end{bmatrix}$$

Consider the data matrix D given by $$D=TM=TPP^{-1}W$$

Note, first, that TP is the first N−1 columns of T followed by a column of all zeros because of the definition of b. Second, note that $P^{-1}$ is a matrix with the same structure as P but with the sign of b reversed. Hence, $P^{-1}W$ is the matrix W with multiples of its last row subtracted from earlier rows, according to the entries in b. Since the last column of TP is zero, the last row of $P^{-1}W$ can be ignored. Hence, $$D=T'W'$$

where T' is the first N−1 columns of T and W' is derived from W by first subtracting suitable multiples of the last row of W from earlier rows, and discarding the last row of W. It is now instructive to consider cases I and II separately.

In case I, only the rows of W corresponding to a single rigid body have nonzeros in the column of B, so that the row operations caused by $P^{-1}$ affect only a single $W_i$. Thus the modification of W to W' reduces the row dimension of one of the $W_i$ by one. Its effect is equivalent to a reduced rank of that $W_i$.

In case II, the modification of W to get W' will not only modify one of the $W_i$ (the last one if we assume that all of its columns have been switched to the end of the data), but will add multiples of that $W_i$ to the rows holding a different $W_j$. With appropriate interchange of columns, the W' matrix will become block upper triangular as shown in $$W' = \begin{bmatrix} W_1 & \ldots & 0 & 0 \\ \ldots & & & \ldots \\ 0 & \ldots & W_{i-1} & X \\ 0 & \ldots & 0 & W_i' \end{bmatrix} \quad (1)$$

where X is a vector multiple of the last row of $W_i$. (If the transformations of $W_i$ are linearly dependent on more than the transformations of $W_{i-1}$ then there will be more nonzero entries in the last block column of W'.) A case II degeneracy will affect the grouping algorithm since the row-echelon form will now show a second rigid body dependent on an earlier rigid body. The algorithm can be modified to handle this case by first identifying non-base columns of the echelon form that have nonzeros corresponding to no more than four base columns. These correspond to points belonging to the $W_{i-1}$ in the equation above. After these have been found the object corresponding to $W_{i-1}$ has been identified. Now points dependent on a greater number of base columns can be identified to identify a second object.

If there is more than one dependency between two objects a similar argument shows that the above reduction operation (deleting a column of T, subtracting a multiple of a row of W from other rows, and deleting that row from W) will be repeated. As long as the result is a block upper triangular form, the modification suggested above can be used.

It is possible that a later dependency could cause a row from $W_{i-1}$ to be subtracted from the last block, destroying the block upper triangular form. If that happens, it is necessary to reconsider the choice of pivot columns in the decomposition to echelon form. (This can be done starting with the current echelon form.) If the right choice of base columns can be found, the echelon form will be block upper triangular with block of more than 4 by 4. When larger blocks are found, it appears necessary to consider all combinations of pivot column choices. This is exponential in the size of the dependent blocks, so in the worst case could be exponential in the size of the problem.

In a practical situation, future frames may introduce new feature points not previously identified and others identified in earlier frames may disappear. The SVD approach of earlier authors require that such points be dropped completely. In the present invention an algorithm is described that can be applied essentially in real time (assuming a fast enough processor) processing each new group of frames as they are obtained.

Initially a sufficient quantity of frames must be observed to obtain sufficient data to make a preliminary allocation of points to objects. If any points are not present in all objects, they must be discarded. As new data is obtained, new points may be identified and earlier points disappear. Disappearance presents no problem: the columns are simply discarded from the matrix. If they are not base columns, nothing needs to be done. If they are base columns, another base column needs to be identified from the columns belonging to those points in the same object. This can be done by a echelon form reduction on the reduced matrix. It is not necessary to return to the original data. When new points are identified, they should be ignored until several frames have been observed. At that point, an echelon reduction can be performed using only those rows in which the new points have been observed. Since base columns have already been identified, all this reduction needs to do is to determine the dependencies of these new columns(points) in terms of existing base columns. If such dependencies are observed, the point can be grouped with an existing object. If none are observed, it is a candidate for a point in a new object.

Having grouped features or points with respective moving bodies in the image, the information is provided to an application specific apparatus for appropriate additional signal processing such as, for example, in collision avoidance or robot vision applications. Depending upon the specific application, the additional processing relies upon the point grouping to determine the trajectory of the moving body associated with the grouped points.

While there has been described the grouping of points or features associated with moving bodies in an image, it will be apparent to those skilled in the art that variations and modifications are possible without deviating from the broad principles and spirit of the present invention which shall be limited solely by the scope of the claims appended hereto.

What is claimed is:

1. An imaging system for determining the number of independent moving bodies in image frames containing a plurality of moving bodies, associating points in the image with respective bodies and determining the trajectories of the moving bodies comprising:

means for obtaining a sequence of images containing a plurality of moving bodies;

feature detector means for obtaining image data related to identified points arising from the moving bodies in said sequence of images;

computing means for receiving said image data related to identified points, said computing means:

forming a matrix W where column vector $w_i$ of matrix W includes the coordinates of each ith point;

representing the set of all points of $M=\text{diag}(w_1, w_2, \ldots, w_s)$ where $w_p$, $p=1, \ldots, s$ are point coordinates and there are s bodies and each body has a set of $n_p$ feature points;

forming a block transformation matrix T having entries $T_{jp}, j=1, \ldots, m$ and $p=1, \ldots, s$ where $T_{jp}$ is the pth object in the jth frame subject to a transformation/projection;

representing the observed data, matrix D, as D=TM where the upper bound on the rank of D is 4 s and the lower bound is s where s is the number of independent moving bodies;

forming the echelon form of matrix D; and providing output data commensurate with the number of independent bodies in the image and with which points are associated with respective bodies from the echelon form of matrix D where columns having non-zero elements in the same row correspond to points belonging to same rigid body if matrix T has full rank and where the rank of echelon form of matrix D is related to a lower bound on the number of independent bodies in the image, and processor means receiving said output data for determining the trajectories of each moving body in said sequence of images.

2. An imaging system as set forth in claim 1, where when matrix T is not of full rank, said forming a block transformation matrix T comprises deleting a column of matrix T, subtracting a multiple of a row of W from other rows and deleting that row from W.

3. An imaging system as set forth in claim 1, wherein forming the echelon form of matrix D includes selecting a tolerance value.

4. An imaging system as set forth in claim 1, wherein forming the echelon form of matrix D includes selecting a rank tolerance value and a grouping tolerance value.

5. An imaging system as set forth in claim 1, wherein forming the echelon form of matrix D includes applying Gauss-Jordan elimination to rows of matrix D.

6. An imaging system as set forth in claim 1, wherein forming the echelon form of matrix D includes includes column scaling and shifting of matrix D.

7. An imaging system as set forth in claim 1, wherein forming the echelon form of matrix D includes row scaling and shifting of matrix D.

8. An imaging system as set forth in claim 2, wherein forming the echelon form of matrix D includes selecting a tolerance value.

9. An imaging system as set forth in claim 2, wherein forming the echelon form of matrix D includes selecting a rank tolerance value and a grouping tolerance value.

10. An imaging system as set forth in claim 2, wherein forming the echelon form of matrix D includes applying Gauss-Jordan elimination to rows of matrix D.

11. An imaging system as set forth in claim 2, wherein forming the echelon form of matrix D includes includes column scaling and shifting of matrix D.

12. An imaging system as set forth in claim 2, wherein forming the echelon form of matrix D includes row scaling and shifting of matrix D.

13. An imaging system as set forth in claim 1, further comprising means for supporting said imaging system and said processor means determining whether any of the moving bodies will collide with said means for supporting said imaging system.

14. An imaging system set forth in claim 1, where said processor means identifies moving bodies traveling relative to said means for obtaining a sequence of images.

15. An imaging system as set forth in claim 1, where said processor means identifies the motion of the moving bodies relative to said means for obtaining a sequence of images.

16. An imaging system including a camera, a feature detector, a computer, and a processor for determining the number of independent moving bodies in image flames containing a plurality of moving bodies and associating points in the image with respective bodies for determining the trajectories of the moving bodies comprising;

a camera for recording a sequence of image frames of a scene containing a plurality of moving bodies;

a feature detector for obtaining image data related to identified points arising from the moving bodies in said sequence of image frames recorded by the camera;

a computer for receiving said image data related to identified points, said computer:

forming a matrix W where column vector $w_i$ of matrix W includes the coordinates of each ith point;

representing the set of all points by M=diag($w_i$, $w_2$, . . . , $w_s$) where $w_p$,p=1, . . . , s are point coordinates and there are s bodies and each body has a set of $n_p$ feature points;

forming a block transformation matrix T having entries $T_{jp}$,j=1, . . . , m and p=1, . . . , s, where $T_{jp}$ is the pth object in the jth frame subject to a transformation/projection;

representing the observed data, matrix D, as D=TM where the upper bound on the rank of D is 4 s and the lower bound is s, where s is the number of independent moving bodies;

forming the echelon form of matrix D; and providing output data commensurate with the number of independent bodies in the image and with which points are associated with respective bodies from the echelon form of matrix D where columns having non-zero elements in the same row correspond to points belonging to same rigid body if matrix T has full rank and where the rank of echelon form of matrix D is related to a lower bound on the number of independent bodies in the image, and a processor for receiving said output data and determining the trajectories of each moving body in the sequence of image frames.

17. An imaging system as set forth in claim 16, where when matrix T is not of full rank, said forming a block transformation matrix T comprises deleting a column of matrix T, subtracting a multiple of a row of W from other rows and deleting that row from W.

18. An imaging system as set forth in claim 16, wherein forming the echelon form of matrix D includes selecting a tolerance value.

19. An imaging system, a method as set forth in claim 16, wherein forming the echelon form of matrix D includes selecting a rank tolerance value and a grouping tolerance value.

20. An imaging system, a method as set forth in claim 16, wherein the step of forming the echelon form of matrix D includes applying Gauss-Jordan elimination to rows of matrix D.

21. An imaging system as set forth in claim 17, wherein forming the echelon form of matrix D includes selecting a tolerance value.

22. An imaging system as set forth in claim 17, wherein forming the echelon form of matrix D includes selecting a rank tolerance value and a grouping tolerance value.

23. An imaging system as set forth in claim 17, wherein forming the echelon form of matrix D includes applying Gauss-Jordan elimination to rows of matrix D.

24. An imaging system as set forth in claim 16, further comprising means for supporting said imaging system and said processor determining whether any of the moving bodies will collide with said means for supporting said imaging system.

25. An imaging system as set forth in claim 16, where said processor identifies moving bodies traveling relative to said camera.

26. An imaging system as set forth in claim 16, where said processor identifies the motion of the moving bodies relative to said camera.

* * * * *